United States Patent [19]

Tashima et al.

[11] Patent Number: 4,993,228

[45] Date of Patent: Feb. 19, 1991

[54] INTERNAL COMBUSTION ENGINE WITH TURBO SUPERCHARGER

[75] Inventors: Seiji Tashima; Haruo Okimoto; Toshimichi Akagi, all of Hiroshima; Naoyuki Matsumoto, Yamaguchi, all of Japan

[73] Assignee: Mazda Motor Corporation, Hiroshima, Japan

[21] Appl. No.: 357,290

[22] Filed: May 26, 1989

[30] Foreign Application Priority Data

May 27, 1988 [JP] Japan ............................... 63-130839

[51] Int. Cl.$^5$ ............................................. F02B 37/12
[52] U.S. Cl. .......................................... 60/612; 60/602
[58] Field of Search ................................. 60/602, 612

[56] References Cited

U.S. PATENT DOCUMENTS

| | | | |
|---|---|---|---|
| 3,734,074 | 5/1973 | Butler | 60/612 |
| 4,517,801 | 5/1985 | Emonts | 60/602 |
| 4,709,552 | 12/1987 | Rutschmann | 60/612 |
| 4,781,027 | 11/1988 | Richter | 60/602 |

FOREIGN PATENT DOCUMENTS 0166869 1/1986 European Pat. Off. .
2809202 9/1979 Fed. Rep. of Germany ........ 60/612
3629841 5/1987 Fed. Rep. of Germany ........ 60/612
200031 11/1983 Japan .................................. 60/612
61-275531 12/1986 Japan .

*Primary Examiner*—Douglas Hart
*Attorney, Agent, or Firm*—Fleit, Jacobson, Cohn, Price, Holman & Stern

[57] ABSTRACT

An internal combustion engine comprises a primary supercharger operated in substantially a full range of engine operating conditions of a vehicle and a secondary supercharger operated in a specific range of the engine operating condition. The plurality of supercharger are arranged in parallel in the fore and aft direction of a vehicle in a manner such that the primary supercharger means is disposed forward of the secondary supercharger. The primary supercharger is disposed at a front portion of an engine room, just behind a cooling fan, to easily be provided with a cooling effect by virtue of a fresh air. The secondary supercharger is disposed rearward of the primary supercharger to avoid the cooling effect provided by the fresh air and to receive air warmed by the primary supercharger so to undergo a warming up effect.

22 Claims, 4 Drawing Sheets

INTERNAL COMBUSTION ENGINE WITH TURBO SUPERCHARGER

CROSS REFERENCE TO RELATED APPLICATION

The present application is related to co-pending U.S. patent application No. 867,540 filed on May 28, 1986, assigned to the same assignee as the present application.

BACKGROUND OF THE INVENTION

1. Field of the Invention

This invention relates to an internal combustion engine with a turbo supercharger provided with a turbine driven by exhaust gas, and a compressor connected with the turbine by a common shaft. The compressor is driven by the turbine for compressing intake air to provide a supercharging effect on the intake gas, more specifically to an engine with a primary turbo supercharger operated mainly and a secondary turbo supercharger operated in a specific engine operating condition.

2. Description of the Prior Art

Conventionally, there has been known an internal combustion engine with a primary and secondary turbo superchargers wherein a control for the superchargers is switched between a first condition, in which one of them is driven, and a second condition, in which both of them are driven, in accordance with an engine operating condition, as disclosed in Japanese Utility Model Public Disclosure No. 60-178329. Japanese Patent Public disclosure Nos. 56-41417, 59-160022, 60-259722 (corresponding to European patent application No. 166869) and Japanese Utility Model Publication No. 57-12177 disclose similar types of engines, respectively. The engine disclosed in Japanese Utility Model Disclosure No. 60-178329 is provided with a plurality of cylinders having respective exhaust passages therefrom. The exhaust passages are divided into two groups. There are provided gate valves for controlling introduction of the exhaust gas into the turbo superchargers. Under the first condition, the exhaust gas from the cylinders are introduced into only the primary turbo supercharger through one of the groups of the exhaust passages by virtue of the operation of the gate valves. In the second condition, the exhaust gas is introduced into both the primary and secondary turbo superchargers. Such engines as disclosed in the Japanese publication can improve the efficiency of supercharging effect in accordance with the engine operating condition.

Meanwhile, in order to get a better performance of the turbo supercharger, it is critical that the superchargers are kept in an appropriate thermal range.

It should, however, be noted that it is difficult for the conventional internal combustion engine with a plurality of turbo superchargers to provide all of the turbo superchargers with a substantially uniform, thus proper, thermal condition while operating. This is because an operating conditions is different in each supercharger, for instance, the primary turbo supercharger which is driven in any supercharging condition of the engine, tends to be heated because of a heavy load in operating period, as compared with the secondary turbo supercharger, which is driven in only a specific engine operating condition. The turbo superchargers are usually arranged to be subjected to an air cooling effect by a cooling fan and blowing air into an engine room while the vehicle is running, in addition to a cooling effect provided by a coolant. As a result, some of the turbo superchargers are kept at an unduly high temperature and some of them at an unduly low temperature. This may cause a deterioration the warming up property of the superchargers.

SUMMARY OF THE INVENTION

It is, therefore, an object of the present invention to provide an internal combustion engine with a plurality of turbo superchargers which can provide each of the superchargers with a proper thermal condition so as to get a better performance of the superchargers.

It is another object of the present invention to provide an internal combustion engine with a plurality of turbo superchargers wherein the superchargers are prevented from both unduly heated condition and unduly cooled condition to provided an improved warming up property.

According to the present invention, the above and other objects of the invention can be accomplished by an internal combustion engine comprising a plurality of turbo supercharger means including primary supercharger means operated in substantially a full range of an engine operating conditions of a vehicle and secondary supercharger means operated in a specific range of the engine operating conditions. The plurality of the turbo supercharger means are arranged side by side in a fore and aft direction of a vehicle in a manner such that the primary supercharger means is disposed forward of the secondary supercharger means. The turbo supercharger means are connected in parallel to a main body of the engine, into which the intake gas is introduced for combustion. The turbo supercharger means are arranged side by side in a longitudinal direction, or fore and aft direction of the vehicle at a position adjacent to the main body of the engine, transversely at one side of the main body of the engine. The turbo supercharger means are arranged in a mirror image relationship with each other. Preferably, the turbines thereof face each other. In this case, rotation shafts of the turbo supercharger means extend in the fore and aft direction of the vehicle along the one side of the main body of the engine. The shafts of the turbo supercharger means may be arranged substantially coaxially. Alternatively, the turbo supercharger may be arranged side, by side wherein each of the rotation shaft of the turbo supercharger means extends transversely.

According to the present invention, the primary supercharger means usually operated is exposed to blowing air introduced into an engine room during running of the vehicle to get a sufficient cooling effect thereof. On the other hand, the secondary supercharger means is restricted from an exposure to the blowing air because of the intervention of the primary supercharger means so that the cooling effect of the blowing can be reduced.

The above and other objects and features of the present invention will become apparent from the following description, when considered in connection with the preferred embodiment and while taking reference to the accompanying drawings.

DESCRIPTION OF THE PREFERRED EMBODIMENTS

Figure 1:
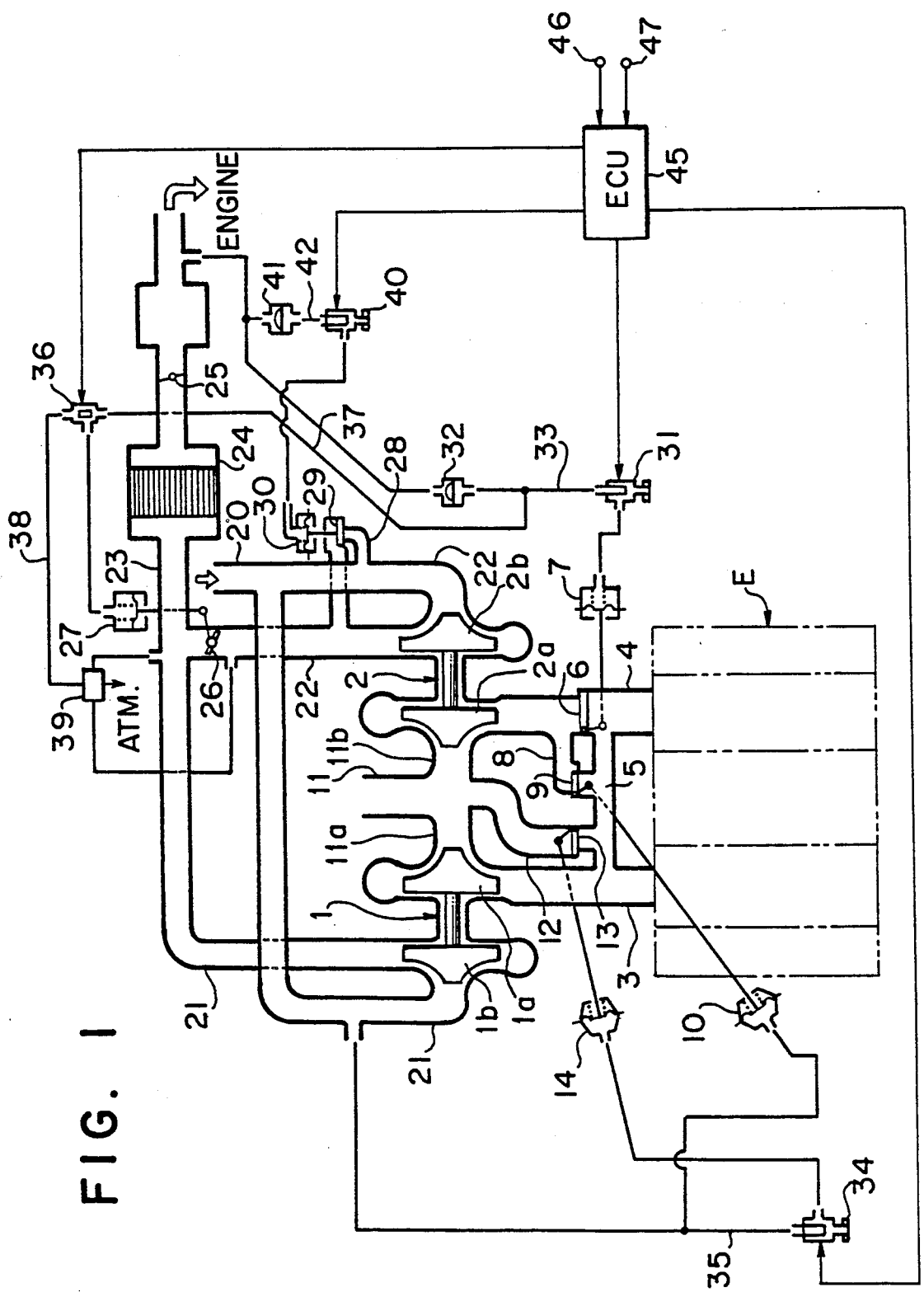
FIG. 1 is a schematic view of intake and exhaust systems of an engine with a plurality of turbo superchargers in accordance with a preferred embodiment of the present invention.

Referring to the drawings, specifically to FIG. 1, there is shown a schematic view of an intake system of a dual rotor type rotary piston engine E to which the present invention is applied.

A rotor chamber displacement of the engine E is 654 cc. The engine E comprises a primary turbo supercharger 1 and a secondary turbo supercharger 2 provided with turbines 1a, 2a driven by an exhaust gas and compressors 1b, 2b associated with the turbines for supercharging an intake gas respectively. The primary turbo supercharger 1 is larger than the secondary turbo supercharger 2 in size or in capacity. An exhaust passage 3 connected with a first rotary mechanism is connected with the turbine 1a of the primary turbo supercharger 1 and exhaust passage 4 connected with a second rotary mechanism is connected with the turbine 2a of the secondary turbo supercharger 2. The exhaust passage 3 is connected the exhaust passage 4 by a connecting passage 5 upstream the turbines 1a and 2a. An exhaust shut off valve 6 is arranged in the exhaust passage 4 upstream the turbine 2a of the secondary turbo supercharger 2. The shut off valve 6 is controlled by an actuator 7 constituted by a diaphragm device and the like. There is provided a bypass valve 9 on a bypass passage 8 bypassing the shut off valve 6 for introducing a small amount of the exhaust gas to the turbine 2a of the secondary turbo supercharger 2 to rotate it preliminary before the shut off valve is opened. The bypass valve 9 is controlled by an actuator 10. Exhaust passages 11a and 11b, connected with the turbine 1a and 2a, are merged downstream the turbine 1a and 2a to form a common exhaust passage 11. There is also provided a waste gate passage 12 bypassing the turbines 1a and 2a. On the waste gate passage 12 is arranged a waste gate valve 13 which is controlled by an actuator 14 actuated in accordance with a supercharged pressure of the intake gas. The waste gate passage 12, in this embodiment, is provided so as so connect the exhaust passage 5 with the exhaust passage 11. The waste gate passage 12 may be provided to connect inlet portions of the superchargers 1 and 2 with outlet portions thereof respectively.

An intake system of the engine E is provided with a primary intake passage 21 on which the compressor 1b of the primary turbo supercharger 1 is arranged and a secondary intake passage 22 on which the compressor 2b of the secondary turbo supercharger 2 is arranged. The primary and secondary intake passages 21 and 22 are separated from an upstream intake passage 20 and merged again downstream the compressors 1b, 2b to form a downstream intake passage 23. On the downstream intake passage 23 is arranged an inter-cooler 24 and a throttle valve 25. Eventually the passage 23 is connected with an intake manifold (not shown) through which the intake gas is introduced into the engine E. An intake shut off valve 26 is arranged on the secondary passage 22 in the vicinity of a merged portion of the primary and secondary passages 21 and 22. The shut off valve 26 is controlled by an actuator 27. On the secondary passage 22 is provided a relief passage 28 so as to bypass the compressor 2b. A relief valve 29 controlled by an actuator 30 is mounted on the relief passage 28.

The actuator 7 of the exhaust shut off valve 6 is controlled by a three way solenoid valve 31 controlled by a signal from an electric control unit 45 for selectively connecting the actuator 7 with either a negative pressure passage 33 or the atmosphere. The passage 33 is connected with a negative pressure source, such as a portion of the intake passage 23 downstream the throttle valve 25, through a check valve 32.

The actuator 14 of the waste gate valve 13 likewise is connected selectively with either a supercharging passage 35 or the atmosphere through a three way solenoid valve 34 controlled by a signal from the control unit 45. A supercharged pressure is introduced into the passage 35 from a portion of the primary intake passage 21 downstream the compressor 1b of the primary turbo supercharger 1. As a result, the waste gate valve 13 is controlled between close and open.

In this case, the actuator 14 is biased by means of a spring so that the waste gate valve 13 is opened when the supercharged pressure reaches a predetermined maximum value allowed to be introduced into the engine E.

The actuator 10 of the bypass valve 9 is connected directly with the supercharging passage 35. The actuator 10 is biased by means a spring so that the bypass valve can be opened by a relatively low supercharged pressure.

The actuator 27 of the intake shut off valve 26 is selectively connected with either a negative pressure passage 37 or a passage 38 communicated with a switch valve 39 responsive to a pressure through a three way solenoid valve 36. A intake gas pressure is introduced into the switch valve 39 through both the primary intake passage 21 downstream the compressor 1b and the secondary intake passage 22 downstream the compressor 2b. The switch valve 39 connects the passage 38 with the atmosphere when the difference between the pressures from the passages 21 and 22 is smaller than a predetermined value.

When the actuator 27 is communicated with the negative pressure passage 37, the shut off valve 26 is closed because of the negative pressure to the actuator 27. When the actuator 27 is communicated with the passage 38 in the case where the passage is closed by the switch valve 39, the shut off valve 26 is kept closed because the negative pressure is held in the actuator 27. Only when the actuator 27 is communicated with the passage 38 and the passage 38 is connected with the atmosphere, is intake shut off valve 26 opened.

The actuator 30 of the relief valve 29 is selectively connected with either a negative pressure passage 42 into which a negative pressure is introduced through a check valve 41 or the atmosphere. The relief valve 29 is controlled between closed and open positions in accordance with a switching action of for the actuator 30.

Figure 2:
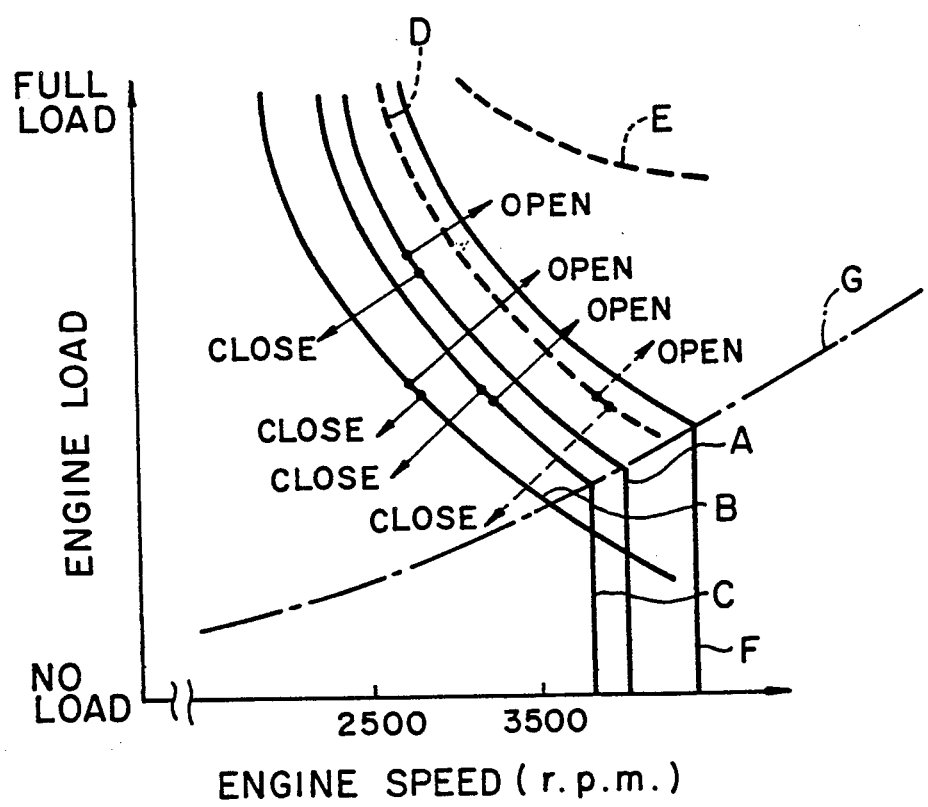
FIG. 2 is a graphical representation showing control properties for valves employed in the systems of the engine of FIG. 1.

As shown in FIG. 2, the shut off valve 6 is controlled in accordance with a signal from the control unit 45 based on the signals from sensors 46 and 47 so as to be opened when engine speed and/or engine load or intake gas are increased beyond a control line A. The bypass valve 9 is controlled to be opened when the engine speed and the engine load is increased beyond a control line B. The control line B is determined in a manner that the bypass valve 9 is opened before the shut off valve 6 is opened when the engine speed and/or the engine load is increased. As a result, the exhaust gas introduced through the bypass valve 9 provides turbine 2a with a preliminary rotation so that a responsiveness of the secondary turbo supercharger can be improved when the shut off valve 6 is opened. In FIG. 2, line G is a road load line showing a change in the engine load when the vehicle runs on a plain path.

The relief valve 29 is controlled based on a control line C as well as the shut off valve 6 and the bypass valve 9.

The control line C is provided lower than the control line A with regard to the engine speed and the engine load so that an undue increase in pressure within the intake passage 22 can be prevented in the case where the secondary turbo supercharger 2 is rotating by virtue of the inertia force, such as a condition under the preliminary rotation and a deceleration of the vehicle. In addition, when a supercharging operation by the secondary turbo supercharger 2 is initiated, a relief of the intake gas can be stopped. In the case where the shut off valve 6 is opened, the relief valve 29 is closed to prevent a dilution gas from an undesirable change caused by a fluctuation of the exhaust gas pressure in the second rotary mechanism.

The intake shut off valve 26 is opened when a difference between the pressure in the primary intake passage 21 and that in the secondary intake passage 22 is decreased below a predetermined value after the exhaust shut off valve 6 is opened and the secondary turbo supercharger 2 is actuated as shown by a dotted line D. In this control, the three way valve 36 is controlled by the control unit 45 in accordance with the engine speed to connect the actuator 27 with the negative pressure passage 37 when the engine speed is relatively low and with the passage 38 when the engine speed is relatively high. The atmospheric pressure introduced into the actuator 27 through the passage 38 when the difference in pressure between the intake passages 21 and 22 is smaller than the predetermined value so that the shut off valve 26 is opened. Thus, the intake gas is prevented from flowing back into the secondary intake passage 22.

The waste gate valve 13 is opened when the intake pressure reaches the maximum supercharging pressure allowable for the superchargers 1 and 2 as shown by a dot line E. The line E can be shifted in accordance with control conditions therefor within a range beyond a line F in FIG. 2. This means that the waste gate valve 13 is restricted by means of the three way valve 34 not to be opened when the engine operating condition is in a range lower than the line F in which the engine speed and/or the engine load is relatively low.

Figure 3:
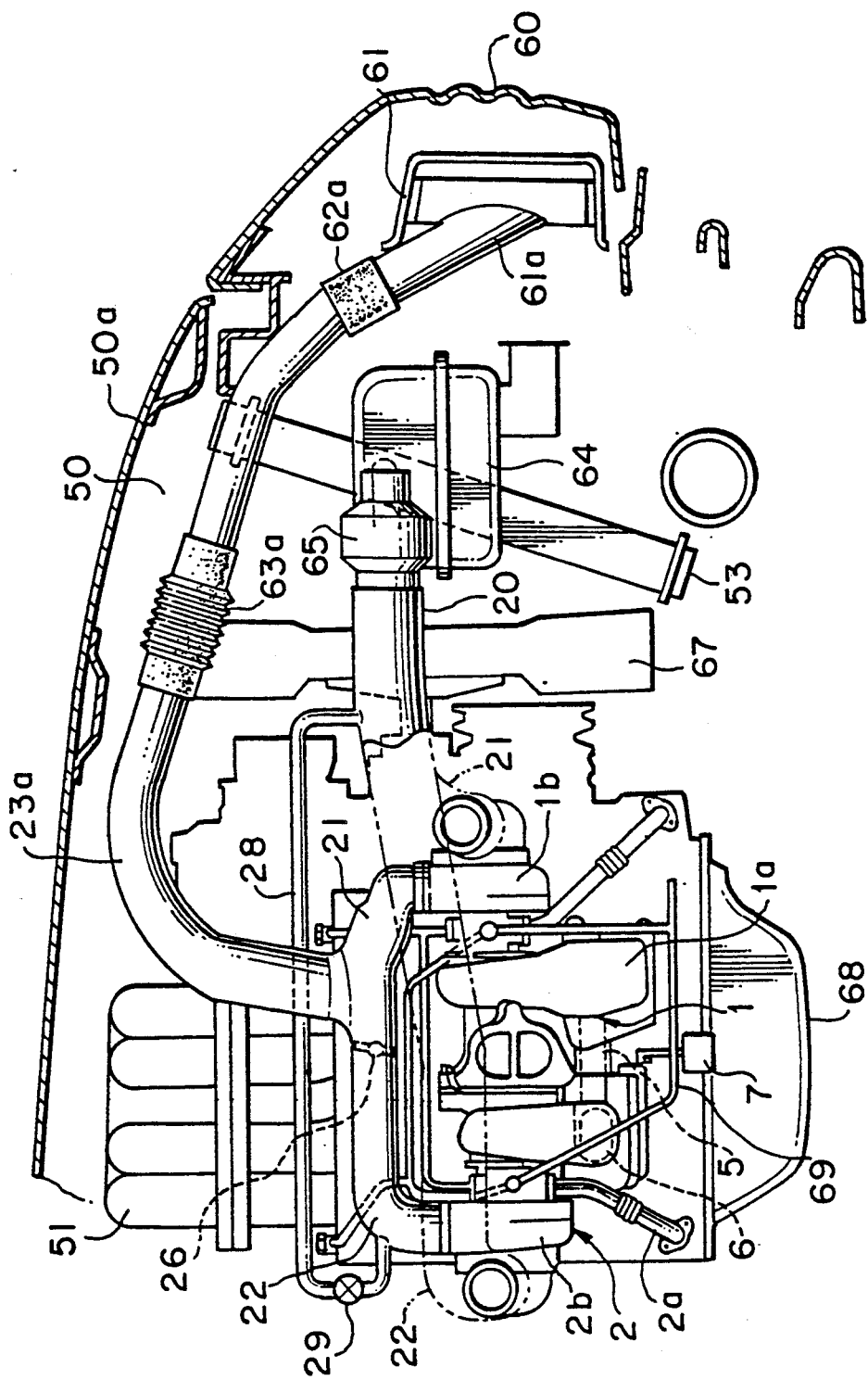
FIG. 3 is a side view showing the engine mounted on a vehicle.
Figure 4:
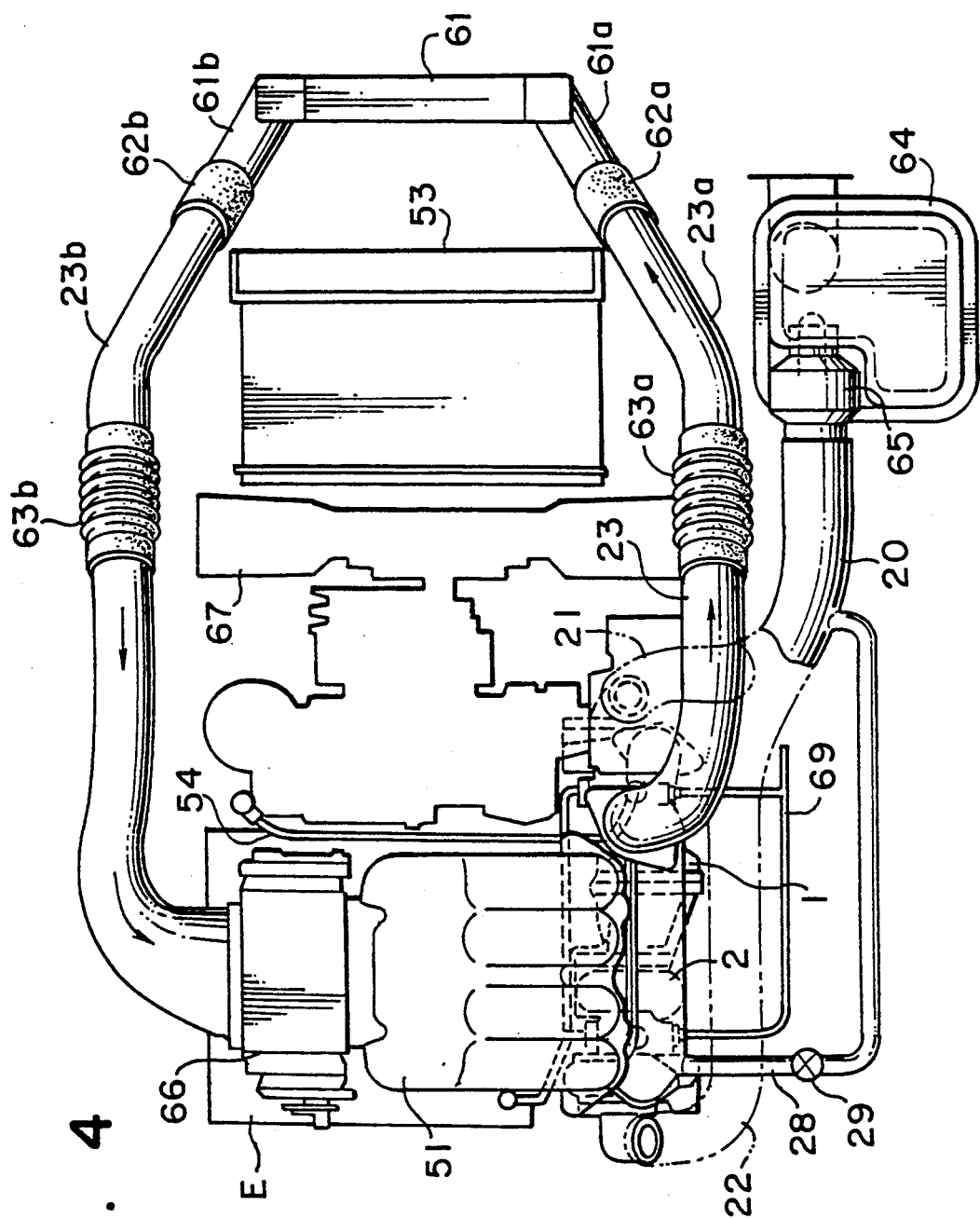
FIG. 4 is a plan view showing the engine of FIG. 3.

Referring to FIGS. 3 and 4, the engine E is mounted in an engine room 50 defined by a bonnet 50a and a front portion of the vehicle body. The turbo superchargers 1 and 2 are connected in parallel to a main body of the engine E into which the intake gas is introduced for combustion. An oil pan 68 is attached to a lower end of the main body of the engine E. The turbo superchargers 1 and 2 are arranged side by side in a longitudinal direction or fore and aft direction of the vehicle at a position adjacent to the main body of the engine E transversely at one side of the main body of the engine E. The turbo superchargers 1 and 2 are arranged in a mirror image relationship with each other wherein the turbines 1a and 2a thereof face each other. Rotation shafts of the turbo superchargers 1 and extend in the fore and aft direction of the vehicle along the one side of the main body of the engine E. The shafts of the turbo superchargers 1 and 2 may be arranged substantially coaxially. The primary turbo supercharger 1 is positioned forward of the secondary turbo supercharger 2. A coolant return passage 69 is connected with both the primary turbo supercharger 1 and secondary turbo supercharger 2. There is disposed a bumper 60 at a front end of the engine room 50. The inter-cooler 61 is arranged just behind the bumper 60. The primary intake passage 21 extends upwardly and then rearwardly from an outlet of the compressor 1b of the primary turbo supercharger 1 and the secondary intake passage 22 extends upwardly and then forwardly from the compressor 2b of the secondary turbo superchargers 2. The intake passages 21 and 22 are merged to form an upstream portion 23a of the intake passage 23. Portion 23a extends upwardly and then forwardly along one side of the engine room 50 to be connected with an inlet pipe 61a of the inter-cooler 61 by a rubber tube 62a. The merged portion of the primary and secondary intake passages 21 and 22 is located at a position closer to the primary turbo supercharger 1 in the longitudinal direction of the vehicle. As a result, a length of the primary intake passage 21 between the compressor 1b and the merged portion is shorter than that of the secondary intake passage 22 between the compressor 2b and the merged portion so that a volume of the primary intake passage 21 can be suppressed so as to be as small as possible to improve a responsiveness of the engine control under usual engine operating conditions, that is, a relatively low or medium engine speed condition and/or partial engine load, in which only the primary turbo supercharger 1 is operated. A downstream portion 23b of the intake passage 23 is connected with an outlet pipe 61b of the inter-cooler 61 by a rubber tube 62b and extend rearwardly toward the main body of the engine E along the other side of the engine room 50. Both the upstream and down stream portions 23a and 23b of the passages 23 are located at opposite sides of the main body of the engine E with regard to the traverse direction of the vehicle and are provided with flexible tubes 63a and 63b at the intermediate positions respectively. A down stream end of the intake passage 23 is connected with an intake manifold 51 arranged over the main body of the engine E through a throttle chamber 66 in which the throttle valve 25 is disposed. There is disposed a cooling fan 67 forward of and adjacent to the main body of the engine E. A radiator 53 is arranged between the inter-cooler 61 and the cooling fan 51 in the longitudinal direction of the vehicle. An air cleaner 64 is arranged opposite to the radiator 53 with regard to the upstream portion 23a of the passage 23. An air flow meter 65 is provided downstream end or rear portion of the air cleaner 64. The intake passage 20 extends from the air flow meter 65 rearwardly and downwardly to be divided into the primary intake passage 21 and the secondary intake passage 22.

The primary intake passage 21 extends transversely from the divided portion of the passage 20 and then extends downwardly to be connected with an inlet of the compressor 1b of the primary turbo supercharger 1. The secondary intake passage 22 extends rearwardly from the divided portion of the passage 20 and then extends downwardly to be connected with an inlet of the compressor 1b of the secondary turbo supercharger 2. The divided portion of the intake passage 20 is located at a position closer to the primary turbo supercharger 1 in the longitudinal direction of the vehicle. As a result, a length of the primary intake passage 21 between the compressor 1b and the divided portion is shorter than that of the secondary intake passage 22 between the compressor 2b and the divided portion so that a volume of the primary intake passage 21 can be suppressed as small as possible to improve a responsiveness of the engine control under the usual engine operating condition.

The intake shut off valve 26 is arranged in the secondary intake passage 22 at a portion thereof extending longitudinally downstream the compressor 2b of the secondary turbo supercharger 2.

There is provided an oil passage 54 connected with both the primary turbo supercharger 1 and the secondary turbo supercharger 2 so as to lubricate the primary supercharger 1 and thereafter the secondary supercharger 2. A coolant passage 55 is provided for cooling the turbo superchargers 1 and 2. The relief passage 28 extends above the secondary intake passage 22 and is connected with the passage 21 in the vicinity of a downwardly bent portion of the passage 21. The relief valve 29 is mounted on the passage 28 in the vicinity of the connecting portion of the passage 28 with the passage 22.

The primary turbo supercharger 1 is greater than the secondary turbo supercharger 2 in size or capacity so that only the primary turbo supercharger 1 is operated in the usual engine operating condition. As a result, switching operations of the supercharger 2 can be suppressed. The primary intake passage 21 is usually greater than the secondary intake passage 22 in size.

The engine can be provided with three or more cylinders in the case of the reciprocating engine and three or more rotary piston mechanisms in the case of the rotary piston engine. In these cases, more exhaust passages from more cylinders and more rotary piston mechanisms are connected with the primary turbo supercharger 1 in comparison with the secondary turbo supercharger 2.

In operation, the primary turbo supercharger 1 is operated substantially throughout all supercharging engine operating conditions. On the other hand, the secondary turbo supercharger 2 is operated in only a specific engine operating condition in which the engine load and/or engine speed is relatively high. Thus, the primary supercharger 1 tends to be increased in temperature unduly. On the other hand, the secondary turbo supercharger 2 is likely to be kept in a low temperature condition undesirably.

In view of the above, the primary supercharger 1 is disposed at a front portion of the engine room 50 just behind the cooling fan 67 to easily get a cooling effect by virtue of fresh air. The secondary supercharger 2 is disposed rearward of the primary turbo supercharger 1 to avoid the cooling effect of the fresh air and take air warmed by the primary turbo supercharger 1 and thereby is subject to a warming up effect.

While the invention has been specifically described in connection with a preferred embodiment thereof, it will be understood by those skilled in the art that in addition to the foregoing, other changes or modifications in form and details can be made without departing from the spirit and scope of the invention.

What is claimed:

1. An internal combustion engine comprising:
a plurality of turbo supercharger means, including primary turbo supercharger means operated in substantially a full range of engine operating conditions of a vehicle and a secondary turbo supercharger means operated in a specific range of engine operating conditions, the plurality of turbo supercharger means being arranged in parallel with regard to the engine, and
a cooling fan disposed forward of said primary turbo supercharger means in a fore and aft direction of the vehicle, the primary turbo supercharger means being disposed between the secondary turbo supercharger means and the cooling fan in said fore and aft direction of the vehicle so that the secondary turbo supercharger means is shielded, by the primary turbo supercharger means, from cooling air blown rearward by said cooling fan and is subjected to air which has been warmed by said primary turbo supercharger means.

2. An internal combustion engine in accordance with claim 1 wherein the specific range is an engine operating condition in which a relatively large amount of intake air is introduced into the engine.

3. An internal combustion engine in accordance with claim 1 wherein the specific range is defined based on either an engine load or an engine speed.

4. An internal combustion engine in accordance with claim 1 wherein the specific range is defined based on both an engine load and an engine speed.

5. An internal combustion engine in accordance with claim 1, and further comprising a plurality of exhaust passage means communicated with the engine in parallel, turbine means of the plurality of turbo supercharger means being mounted on different exhaust passage means, respectively, among the plurality of the exhaust passage means.

6. An internal combustion engine in accordance with claim 5 wherein one of the plurality of the exhaust passage means is a second exhaust passage means on which the secondary turbo supercharger means is mounted, the second exhaust passage means being provided with valve means opened to introduce an exhaust gas to the secondary turbo supercharger means in the specific range of the engine operating conditions.

7. An internal combustion engine in accordance with claim 1, and further comprising a plurality of intake passage means communicated with the engine in parallel, compressor means of the plurality of turbo supercharger means being mounted on different intake passage means, respectively, among the plurality of the intake passage means.

8. An internal combustion engine in accordance with claim 7 wherein the plurality of the intake passage means, downstream from the plurality of the compressor means, are merged at a merge point to form a merged intake passage means, said merge point of the intake passage means being arranged closer to the compressor means of the primary turbo supercharger means than to the compressor means of the secondary turbo supercharger means with regard to a length of the intake passage means.

9. An internal combustion engine in accordance with claim 8 wherein the merged intake passage means is provided with intake air cooling means located at a front portion of an engine room.

10. An internal combustion engine in accordance with claim 7, and further comprising a single intake passage means divided into a primary upstream intake passage means connected with the compressor means of the primary turbo supercharger means and a secondary upstream intake passage means connected with the compressor means of the secondary turbo supercharger means at a position upstream the compressor means of the primary and secondary turbo supercharger means, the primary upstream intake passage means being shorter than the secondary upstream intake passage means, the single intake passage means being connected with air flow meter means.

11. An internal combustion engine in accordance with claim 10 wherein the air flow meter means is connected with air cleaner means located at a front portion of an engine room.

12. An internal combustion engine in accordance with claim 7 wherein the compressor means of the secondary turbo supercharger means is mounted on a secondary intake passage means, the secondary intake passage means being provided with valve means opened when said secondary turbo supercharger operates in the specific range for introducing an intake gas to the compressor means of the secondary turbo supercharger means.

13. An internal combustion engine in accordance with claim 1 wherein the primary and secondary turbo supercharger means are arranged end to end in the fore and aft direction of the vehicle.

14. An internal combustion engine in accordance with claim 1 wherein rotation shafts of the primary and the secondary turbo supercharger means extend substantially coaxially with each other in the fore and aft direction of the vehicle.

15. An internal combustion engine in accordance with claim 1 wherein the primary and secondary turbo supercharger means are arranged end to end in the fore and aft direction and rotation shafts of the primary and secondary turbo supercharger means extend substantially coaxially with each other in the fore and aft direction of the vehicle.

16. An internal combustion engine comprising:
a main body in which an intake gas is introduced for combustion, said main body disposed in an engine room provided at a front portion of a vehicle,
a plurality of turbo supercharger means, including primary turbo supercharger means operated in substantially a full range of engine operating conditions of the vehicle and secondary turbo supercharger means operated in a specific range of engine operating conditions, the plurality of turbo supercharger means being arranged parallel and adjacent to the main body in a transverse direction of the vehicle, and
a cooling fan disposed forward of said primary turbo supercharger means in a fore and aft direction of the vehicle, the secondary turbo supercharger means being disposed behind the primary turbo supercharger means and the primary turbo supercharger means being disposed behind the cooling fan in the fore and aft direction of the vehicle so that the secondary turbo supercharger means is shielded, by the primary turbo supercharger means, from cooling air blown rearward by said cooling fan and is subjected to air which has been warmed by said primary turbo supercharger means.

17. An internal combustion engine in accordance with claim 16 wherein the primary turbo supercharger means is greater than the secondary turbo supercharger means in capacity.

18. An internal combustion engine in accordance with claim 16, and further comprising cooling fan means disposed forward of the main body.

19. An internal combustion engine in accordance with claim 18, and further comprising intake passage means for connecting the main body and compressor means of the turbo supercharger means, intake air cooling means disposed in the intake passage means for cooling the intake gas, the air cooling means being located forward of cooling fan means.

20. An internal combustion engine in accordance with claim 16 wherein the primary and secondary turbo supercharger means are arranged end to end in the fore and aft direction of the vehicle.

21. An internal combustion engine in accordance with claim 16 wherein rotation shafts of the primary and the secondary turbo supercharger means extend substantially coaxially with each other in the fore and aft direction of the vehicle.

22. An internal combustion engine in accordance with claim 16 wherein the primary and secondary turbo supercharger means are arranged end to end in the fore and aft direction and rotation shafts of the primary and secondary turbo supercharger means extend substantially coaxially with each other in the fore and aft direction of the vehicle.

* * * * *